United States Patent [19]

Amari et al.

[11] 3,939,485

[45] Feb. 17, 1976

[54] MAGNETIC RECORDING AND/OR REPRODUCING SYSTEM

[75] Inventors: Shinji Amari, Hoya; Takashi Masuda, Tokyo, both of Japan

[73] Assignee: Sony Corporation, Tokyo, Japan

[22] Filed: Feb. 18, 1975

[21] Appl. No.: 550,645

[30] Foreign Application Priority Data

Feb. 18, 1974 Japan............................ 49-19259

[52] U.S. Cl. ............................................. 358/4
[51] Int. Cl.² .......................................... H04N 5/79
[58] Field of Search ................................ 358/4, 8

[56] References Cited
UNITED STATES PATENTS

3,821,787  6/1974  Kihara .................................. 358/4

*Primary Examiner*—Howard W. Britton
*Assistant Examiner*—John C. Martin
*Attorney, Agent, or Firm*—Lewis H. Eslinger; Alvin Sinderbrand

[57] ABSTRACT

In a system in which the polarity of the frequency converted chrominance signal or carrier is reversed during alternate lines of alternate fields recorded on alternate tracks on a recording medium and not reversed during the lines that make up the remaining alternate fields recorded in h-alignment on the remaining alternate tracks positioned in interleaving relationship with the first-mentioned tracks, logic-controlled switching means are provided to select the field intervals during which the plurality of the chrominance subcarrier will be reversed in alternate lines. The same logic circuits can be used to control the switching during both recording and reproducing so that the alternate plurality reversal of the chrominance subcarrier will take place during the proper fields during reproduction of the recorded signals. Furthermore, the flip-flop that controls the switching circuit to reverse polarity of the chrominance signal or carrier is, itself, controlled to start always in the correct polarity in those field intervals when it is operative.

6 Claims, 49 Drawing Figures

MAGNETIC RECORDING AND/OR REPRODUCING SYSTEM

BACKGROUND OF THE INVENTION

1. Field of the Invention

This invention relates to means for controlling the switching operation of apparatus of the type disclosed in co-pending applications Ser. No. 492,330, filed July 26, 1974 and Ser. No. 542,697, filed Jan. 21, 1975, both assigned to the assignee of the present case. In particular, the invention relates to means for controlling the operation of switching circuits so that, during both recording and reproducing, the polarity of the chrominance subcarrier will be reversed or not reversed during corresponding line intervals.

2. The Prior Art

In the system disclosed in the previously mentioned application Ser. No. 492,330, a switching circuit is provided to reverse the polarity of the chrominance signal when a color television signal is recorded. The polarity reversal takes place during alternate line intervals of signals recorded on alternate tracks on a recording medium. The polarity of the chrominance signal recorded on the interleaving tracks is not reversed during any line interval. The signals are also recorded in h-alignment which means that the synchronizing signals at the end of each line interval of each track are recorded so as to be aligned side by side with the recordings of synchronizing signals at the end of each of the line intervals of the next adjacent track.

Due to h-alignment and to the sequence of polarity reversals of the chrominance signals in alternate lines, the undesired cross-talk signal picked up from the next adjacent track when playing back the desired track can be minimized by passing the combined desired and cross-talk signals through a switching circuit that alternately reverses the polarity of successive line intervals of the chrominance signal and then passing the output signal of the switching circuit through a comb filter that adds the chrominance signals of two successive line intervals at a time. The switching circuit must be actuated so that it will reverse the polarity of alternate line intervals only during the reproduction of those tracks in which the polarity of the signals was reversed during recording and will not reverse the polarity of alternate line interval signals during the reproduction of those tracks in which the polarity was not reversed during recording.

In the system disclosed in the previously mentioned application Ser. No. 542,697, the switching circuit is connected to switch the polarity of only the chrominance subcarrier and not of the entire chrominance signal. The pattern of switching, whereby the polarity of the chrominance subcarrier is reversed at the end of each line interval during the recording of one track but not reversed during the recording of the next track, is still the same as in the apparatus disclosed in application Ser. No. 492,330.

It is one of the objects of the present invention to provide a circuit that responds automatically to the synchronizing signals and signals obtained due to rotation of the rotating transducer to select specific field intervals in which the polarity reversal is to take place. Polarity reversal during the remaining field intervals recorded on interleaving tracks will automatically be avoided.

SUMMARY OF THE INVENTION

In accordance with the present invention, a fixed transducer located adjacent the rotating structure in the recording apparatus picks up signals timed to be synchronous with the rotation. In recording, the vertical synchronizing signals are separated from the composite television signal and are applied to a flip-flop that produces a square wave signal having a repetition rate ½ the repetition rate of the vertical field synchronizing signals. This square wave signal is then used to control another flip-flop that is supplied with signals recurring at the horizontal repetition rate. The combination of these signals supplied to the latter flip-flop causes it to produce an output signal that generates a square wave at one-half the repetition rate of the line, or horizontal, synchronizing signals during alternate field intervals and to remain at one polarity during the remaining alternate field intervals. This signal controls a switching circuit to produce the required sequence of polarity reversal of the chrominance signal or chrominance subcarrier in the recording apparatus.

In reproducing apparatus to reproduce signals recorded by the aforesaid recording apparatus, the same control circuit configuration is used as in the recording apparatus and is controlled by signals picked up from the rotating mechanism and by synchronizing signals derived from the reproduced television signal. If these reproduced synchrnozing signals occur at the proper time with respect to signals picked up from the rotating apparatus, the curcuit will contine to operate without any further effect on the switching circuit in the reproducing apparatus. However, if the reproduced vertical synchronizing signals do not properly coincide with signals picked up from the rotating apparatus, the flip-flop connected to be actuated by vertical synchronizing signals will be reset so as to reverse the times that the controlled flip-flop was in its respective high and low output conditions.

DESCRIPTION OF THE PREFERRED EMBODIMENTS

Figure 1:
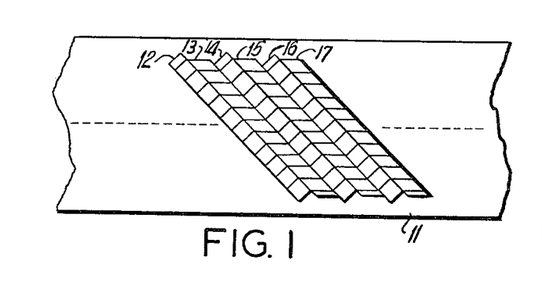
FIG. 1 shows a short length of magnetic tape and illustrates the location of several adjacent tracks of video signals recorded thereon.

The short length of tape 11 shown in FIG. 1 has six tracks 12-17 recorded on it. These tracks are shown as being recorded in abutting relationship, and the tracks are shown divided into small subsections, each of which represents the small area on which the entire video signal corresponding to one line of a complete television image is recorded. The smaller sections at the ends of the tracks represent half-line intervals for interlaced scanning.

The lines marking the ends of each of the subsections in each of the tracks 12-17 may be considered to represent the locations at which the horizontal synchronizing signals are recorded. The recording is said to be h-aligned since the horizontal signal, sometimes referred to as the h signals, are recorded in alignment with corresponding signals on adjacent tracks. This is a well-known technique for reducing the type of cross-talk that would otherwise occur between adjacent tracks if the recorded horizontal synchronizing signals were not aligned.

Figures 2A, 2B:
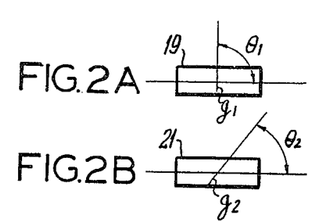
FIGS. 2A and 2B show the surfaces of two magnetic transducers of the type used in recording the tracks illustrated in FIG. 1.

The lines representing the location of recording of the horizontal synchronizing signals in the tracks 12, 14, and 16 are represented as being perpendicular to the longitudinal direction of such tracks whereas the lines representing the location of recording of horizontal synchronizing signals in the tracks 13, 15, and 17 are at a different angle with respect to the longitudinal direction of those tracks. This difference in angle is produced by the air gap in the recording transducers as shown in FIGS. 2A and 2B. The air gap $g_1$ in the transducer 19 in FIG. 2A has an angle $\theta_1$ with respect to the line representing the direction of movement of the tape relative to the transducer 19. The angle $\theta_1$ is represented as a right angle and thus the transducer 19 would be used to record the tracks 12, 14, and 16. The transducer 21 in FIG. 2B has an air gap $g_2$ at an angle $\theta_2$ with respect to the line representing the direction of relative movement between the tape and the transducer. The transducer 21 is the one that would be used to record the tracks 13, 15, and 17. The angles $\theta_1$ and $\theta_2$ are known as the azimuth angles, and it is not necessary that either of them be perpendicular to the direction of relative movement between the transducer and the tape.

The recording of information at different azimuth angles reduces cross-talk between adjacent tracks not only from horizontal synchronizing signals but also from other signals. In order to pick up the highest frequency components recorded on a magnetic medium it is important that the azimuth angle of the reproducing transducer correspond exactly to the aximuth angle of the transducer used to record that information. Any discrepancy in the azimuth angles of the recording and reproducing transducers reduces the highest frequency signals that could otherwise be reproduced. Deliberately choosing widely different azimuth angles in recording adjacent tracks 12-17 in FIG. 1 substantially reduces any cross-talk from high frequency, and even medium frequency, components recorded on adjacent tracks. Only the cross-talk between relatively low frequency components remains a problem.

Figure 3:
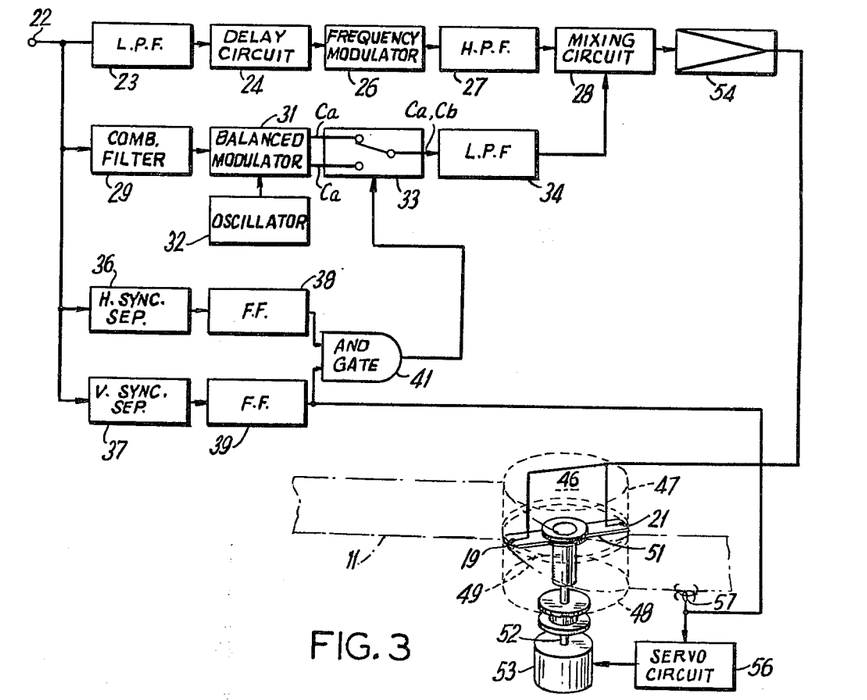
FIG. 3 is a prior art circuit of apparatus for recording video information with a certain sequence of reversals of polarity of the chrominance signal.

The aforesaid prior application provided several techniques to reduce cross-talk of low frequency components between adjacent tracks, even though the tracks were recorded in abutting or even slightly overlapping relationship. FIG. 3 shows a block diagram of one type of recording apparatus described in the aforesaid prior application.

In FIG. 3 a composite video signal is applied to an input terminal 22. From there the signal branches out into four paths, one of which leads to a low pass filter 23 that passes luminance signal components up to about 2.5 MHz or so. The output of the low pass filter is applied to a delay circuit 24 that equalizes the signal delay in other parts of the branched circuit. The luminance signal output of the delay circuit 24 is connected to a frequency modulator 26 to frequency modulate a carrier signal in accordance with standard video tape recording practice. The output signal of the frequency modulator is filtered by a high pass filter 27 and applied to a mixing circuit 28.

The composite video signal is also applied to a comb filter 29 which passes the chrominance signal components to a balanced modulator 31. An oscillator 32 is also connected to the balanced modulator 31. The modulator 31 has two output terminals connected to the fixed terminals of a single-pole double-throw switch, or selecting device 33 and the arm of this switch is connected to a low pass filter 34 which is connected, in turn, to the mixer 28.

The composite video signal is also supplied from the input terminal 22 to a horizontal synchronizing, or sync, signal separator 36 and to a vertical sync signal separator 37. The horizontal sync separator 36 is connected to a flip-flop 38 and the vertical sync separator 37 is connected to a flip-flop 39. Both of these flip-flops are connected to an AND gate 41 the output of which is connected to control the switching, or selecting, circuit 43. The flip-flop 39 is also connected to a servo-circuit 43 and to a control signal transducer 44 to record control signals along one edge of the tape 11.

The tape 11 wrapped helically part of the way around a drum 46. This drum comprises an upper portion 47 and a lower portion 48 with a slot 49 therebetween. The two transducers 19 and 21 are located at opposite ends of an arm 51 affixed to the end of a shaft 52 driven by a motor 53. The motor is controlled by the servo-circuit 43. An amplifier 54 connects the mixer 28 to the transducers 19 and 21. The recording apparatus also includes a servo-circuit 56 connected to the motor 53 to control the operation of the motor and connected to the output of the flip-flop 39 to be controlled by signals therefrom. The flip-flop 39 is also connected to a fixed transducer 57 to record the output pulses of the flip-flop along one edge of the tape 11 to serve as control pulses to govern the speed of the tape during playback.

In the operation of the apparatus shown in FIG. 3, the oscillator 32 generates a signal having a fixed frequency $f_c = f_s + f_a$, and this signal combines, in the balanced modulator 31, with the chrominance signal components that pass through the comb filter 29. The balanced modulator 31 substracts the frequencies of the signals supplied thereto, produces two output signals indicated as $C_a$ and $-C_a$ which are of opposite polarity. Each of these signals has the same frequency converted carrier frequency $f_a$, when considered instantaneously, and they are selected alternately by the switching circuit 33 to be applied to the low pass filter 34 that eliminated undesired side bands and applies only the proper frequency converted chrominance component signal to the mixer 28.

The operation of the switching circuit 33 to select either signal $C_a$ or the signal $-C_a$ is controlled by the AND gate 41 in response to output signals from the flip-flops 38 and 39. The selected pattern of recording of the signals $C_a$ and $-C_a$ is illustrated in FIG. 3 which shows a short length of the tape 11 with two adjacent tracks 58 and 59 recorded on it. The track 58 is shown with four line areas, or increments 61–64 and the track 59 is shown with four line areas, or increments, 66–69 h-aligned with the adjacent line areas 61–64 respectively, of the track 58. Each of the line areas 61–64 and 66–69 has two arrows in it, the larger of which indicates the polarity of the frequency converted chrominance component recorded therein, and the smaller of which indicates the polarity of the cross-talk interference signal, which is the frequency converted chrominance component signal in the next adjacent line area of the adjacent track.

Figure 4:
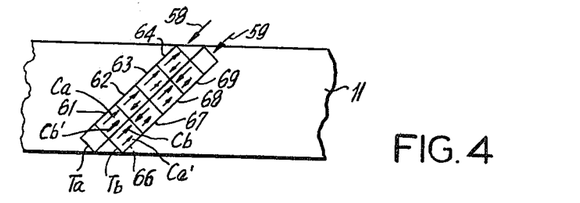
FIG. 4 shows a short length of magnetic tape with two tracks of recorded chrominance signals diagrammatically illustrated thereon.

All of the frequency converted chrominance component signals recorded on the track 58 have a carrier of the same polarity. This may be either the polarity of the signal $C_a$ or of the signal $-C_a$. For the sake of simplifying the explanation it will be assumed that the polarity of the larger arrows in the track 58 indicates that the signal $C_a$ is recorded in all of the line increments 61–64. In the track 59 the polarity of the signal is reversed in alternate line areas of increments, that is, in line areas 66 and 68, the signal $C_a$ is recorded and in line areas 67 and 69 the signal $-C_a$ is recorded. However, the effect of alternately switching back and forth between the signals $C_a$ and $-C_a$ is not as simple as it seems. As will be described hereinafter, the signal in the track 59 may be considered to be a new signal $C_b$ having frequency components offset with respect to the components of the signal $C_a$ (or $-C_a$) to interleave therewith.

Figures 5, 6A:
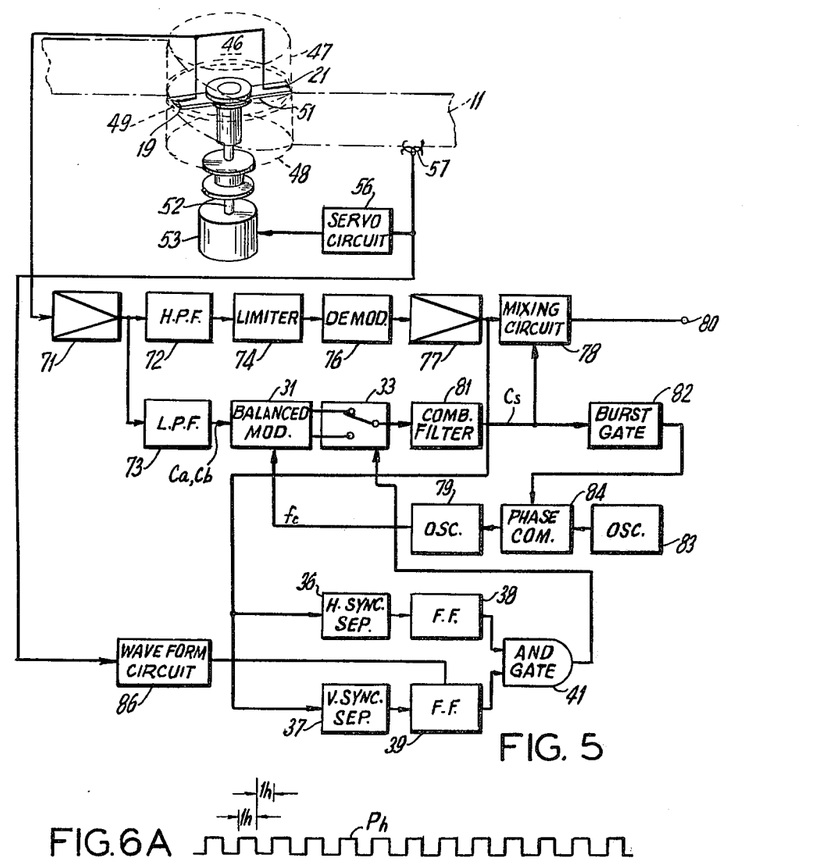
FIG. 5 is a schematic circuit illustrating apparatus for reproducing television signals recorded by the apparatus in FIG. 3.
FIGS. 6A–6C are waveform diagrams illustrating voltages that occur in the operation of the apparatus in FIGS. 3 and 5.
Figure 6B:
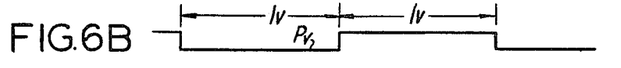

In order to record the signals $C_a$ and $-C_a$ in the pattern set forth in FIG. 3, the simple logic circuit involving the AND gate 41 is used. Line A of FIG. 6 shows the output signal $P_h$ of the flip-flop 38 as being a square wave having high and low intervals, each having a duration of one line interval, of 1h. One complete cycle of the signal in line A of FIG. 6 thus has a fundamental frequency ½($f_h$). The output signal of the flip-flop 39 is shown in line B of FIG. 6 as a square wave $P_v$ having high and low intervals each equal to 1v, where v is a field interval.

Figure 6C:
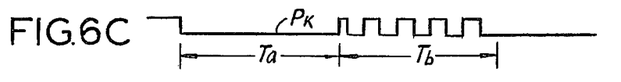

Since the AND gate 41 can produce a high output only when both of the applied signals $P_h$ and $P_v$ are high, the output of the AND gate, as is shown in line C of FIG. 6, remains low during one entire field interval $T_a$ and goes high only during alternate line intervals of the alternate field interval $T_b$. This is based on the assumption that each track records one complete field interval. The pattern shown in FIG. 3 corresponds to having the arm of the switching circuit 33 apply the signal $C_a$ to the low pass filter 34 when the output of the AND gate 41 is low and having the arm apply the signal $-C_a$ to the low pass filter 34 when the output of the AND gate 41 is high.

FIG. 5 shows a playback apparatus for reproducing video signals recorded by the apparatus of FIG. 3. Many of the components in FIG. 5 are identical with those in FIG. 3 and such identical components are indicated by the same reference numerals as in the earlier figures and descriptions of such elements. The description of their operation will not be unnecessarily repeated.

The reproduced signals from the transducers 19 and 21, which are also used in playing back recorded signals, are amplified in an amplifier 71 and are applied to a high pass filter 72 and a low pass filter 73. The high pass filter 72 passes the frequency modulated signal that includes the luminance components. This signal is limited in a limiter 74 and demodulated in a demodulator 76. The re-created luminance signal is then amplified in an amplifier 77 and applied to a mixer 78.

The frequency converted chrominance signal separated by the low pass filter 73 is applied to the balanced modulator 31 along with a signal from an oscillator 79. The signal from the oscillator 79 has a frequency $f_c = f_s + f_a$ and is constant during all line and field intervals. Two output terminals of the balanced modulator 31 are connected to the fixed terminals of the switching circuit 33, and the output of the latter is applied to a comb filter 81. The output of the comb filter is connected to the mixer 78 and to a burst gate 82. The burst gate and the output of an oscillator 83 are connected to a phase comparison circuit 84 that is connected to the oscillator 79. A waveform circuit 86, which may be a rectified, is connected to the transducer 57 to receive reproduced control signals therefrom, and its output is connected to a resetting terminal of the flip-flop 39.

The operation of the system in FIG. 5, insofar as the chrominance component signal is concerned, consists in applying the signal having the frequency $f_c = f_s + f_a$ from the oscillator 79 to the balanced modulator 31 to convert the frequency $f_a$ of the signals $C_a$ and $C_b$, which are applied alternatively to the balanced modulator 31 back to the original chrominance carrier frequency $f_s$. The two output terminals of the balanced modulator 31 provide signals of opposite polarity. One of them includes the desired signal $C_{sa}$ and the undesired or cross-talk signal $C_{sb}'$, while the other includes the desired signal $-C_{sa}$ and the undesired or cross-talk signal $-C_{sb}'$. The designation $C_{sa}$ indicates that the carrier frequency of the frequency converted chrominance signal $C_a$ has been reconverted to the original frequency $f_s$. The designation $C_{sb}'$ indicates that the signal $C_b$, which consisted of alternate line intervals of the signals $C_a$ and $-C_a$ has been reconverted by the same converting signal having the frequency $f_c = f_s + f_a$.

The switching circuit 33 is controlled by the AND gate 41 to produce exactly the same switching pattern as is shown in line C of FIG. 6. The waveform circuit 86 assures that the operation of the flip-flop 39 in the playback unit properly relates to the operation of the flip-flop 39 in the recording system of FIG. 3.

The output of the switching circuit 33 is applied to the comb filter 81. It will be recalled that the comb filter includes both a direct signal and a path in which the signal is delayed by one horizontal line interval. In the comb filter 81 the output of the direct path is added to the delayed output of the other path. Thus, when the chrominance component signals of the track 58 in FIG. 4 are being reproduced, the desired reconverted chrominance component signals $C_{sa}$ corresponding to the signals $C_a$ indicated by the long arrows in two successive line areas 61 and 62 or 62 and 63 or 63 and 64 are combined, with the polarities of their carriers being the same, at the output of the comb filter. However, the undesired, or cross-talk, components $C_{sb}'$ corresponding to the signals $C_b'$ indicated by the small arrows in the line increments have carriers of opposite polarities in successive pairs of lines, and thus cancel each other when combined at the output of the comb filter 81. As a result, the output signal of the comb filter 81 in FIG. 5 during the reproduction of the track 58 consists substantially only of the desired chrominance components $C_s$ having the proper carrier frequency $f_s$. During the reproduction of the track 58, the switching circuit 33 does not switch back and forth between its two input terminals but remains on only one terminal as indicated during the interval $T_a$ in FIG. 6.

During the reproduction of the track 59, the switching circuit 33 does switch back and forth at the end of each line interval of time in accordance with the output signal of the AND gate 41 during the interval $T_b$ as indicated by the long arrows in line areas 66–69 in FIG. 4. The switching signal is indicated in line C of FIG. 6. Thus, the comb filter 81 receives the signals $C_{sb}$ and $C_{sa}'$ during group of line intervals recorded along the track 59.

Considering the signals on a line-by-line basis, since the chrominance signal components recorded in line areas 66 and 67 have opposite polarities, inversion of the signal reproduced from line area 67 causes the chrominance components signal to be combined, in phase, with the delayed chrominance component signal reproduced from line area 66 at the output of comb filter 81. However, since the chrominance component signals are recorded in all liine areas of the next adjacent track 58 with carriers of the same polarity, the reconverted cross-talk signals $C_{sa}'$ from track 58, which are reproduced with the chrominance component signals recorded in the successive line areas of the track 59 also have the same polarity. Therefore, the above-mentioned inverting of the signal reproduced from line area 67 of track 59 causes the cross-talk signal $C_a'$ reproduced with the signal recorded in line area 67 to be combined, with its phase or polarity reversed, with the delayed cross-talk signal reproduced with the signal recorded in line area 66, whereby the combfined cross-talk signals cancel each other at the output of comb filter 81.

The reason why inversion of polarity of the signal $C_a$ at the end of each line interval changes the signal frequency may be explained by considering a simplified situation in which signals $C_a$ and $-C_a$, both of which have the carrier frequency $f_a$, are not modulated by chrominance components but are available at the two output terminals of the balanced modulator 31 in FIG. 3 as pure sine waves of opposite polarity. During the field interval $T_b$ when signals $C_a$ and $-C_a$ are selected alternately by the switching circuit 33, the output signal of the switching circuit is no longer a single signal but is a sine wave whose polarity reverses, or whose phase shifts 180°, at a repetition rate of ½$(f_h)$. When a Fourier analysis is made of such a signal over a complete cycle of the interval of two horizontal lines, it will be found that the carrier frequency $f_a$ is no longer present, but has been replaced by first upper and lower side bands spaced by ±½$(f_h)$ from the original carrier frequency and by additional upper and lower side bands spaced from the first mentioned side bands and from each other, in order, by $f_h$. Therefore, in effect, the single-pole, double-throw switching circuit 33 operates as a balanced modulator, and the modulating signal is the switching signal $P_k$ in line C of FIG. 6. During the interval $T_b$, this signal changes its level at a rate that takes two horizontal line intervals for a complete cycle and therefore has a frequency of ½$(f_h)$. Being, in effect, a balanced modulator, the switching circuit 33 produces a balanced output signal without a carrier. This balanced output signal, since it interleaves with the signal $C_a$ may be referred to as the signal $C_b$, and thus there is, in fact, an interleaving relationship between the carriers of the frequency converted carrier components of the signal recorded on the track 58 and that recorded on the track 59 in FIG. 4. Such interleaving relationship provides for an interleaving relationship between the previously referred to cross-talk or interference signals $C_{sb}$ and $-C_{sb}$ and the desired signals $C_s$ which further improves the cancellation of the cross-talk signals.

FIG. 7 shows the interleaving frequency relationship of the chrominance signals in the circuits in FIGS. 3 and 5. FIG. 7A shows a portion of the spectrum of the frequency converted signal $C_a$ which comprises a central carrier frequency $f_a$ with principal harmonics spaced from it $\pm nf_h$ and with subsidiary harmonics spaced from the carrier frequency $f_a$ and from each of the principal harmonics by the field repetition frequency of the system. The signal $C_a$ is generated in the balanced modulator 31 in FIG. 3 during the recording of the track 58 in FIG. 4.

Figure 7A:
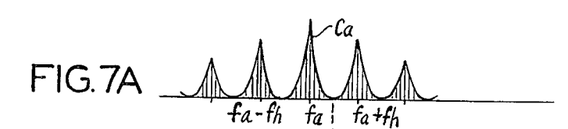
FIGS. 7A–7G represent spectra that occur in the operation of the apparatus in FIGS. 3 and 5.
Figure 7B:
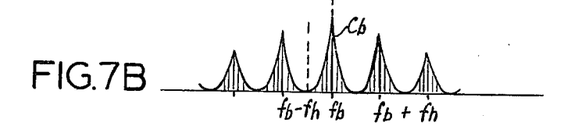

FIG. 7B shows a spectrum similar to that in FIG. 7A, except that its components are offset ½$(f_h)$ with respect to the frequencies in FIG. 7A. The signal in FIG. 7B is the desired chrominance signal $C_b$ recorded in the track 59 in FIG. 4.

Figure 7C:
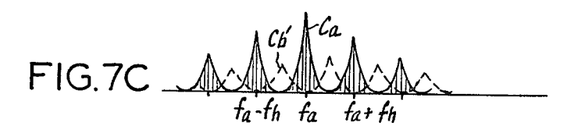
Figure 7D:
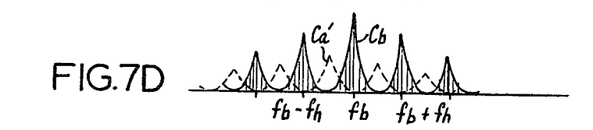

As indicated by the double arrows in each of the line interval areas in the tracks 58 and 59 in FIG. 4, each of the desired chrominance signals is unavoidably mixed with a cross-talk signal. These cross-talk signals are illustrated in the spectra in FIGS. 7C and 7D which correspond, respectively, to the spectra in FIGS. 7A and 7B. In FIG. 7C the cross-talk signal is actually an attenuated version of the signal $C_b$, and is therefore designated as $C_b'$. In FIG. 7D the cross-talk signal is an attenuated version of the signal $C_a$, and is therefore designated as $C_a'$.

Figure 7E:
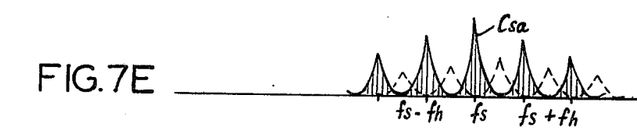
Figure 7F:
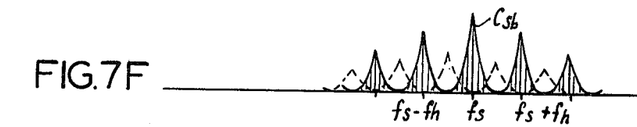
Figure 7G:
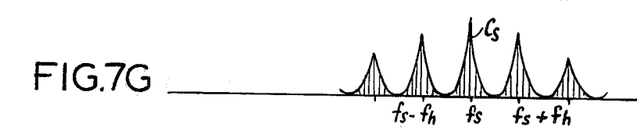

FIGS. 7E and 7F show the spectra of the chrominance signals at the output of the switching circuit 33 in FIG. 5. Although the signals $C_a$ and $C_b$ are converted in the balanced modulator 31 by the signal $f_c = f_s + f_a$ from the oscillator 79, and, as converted, are designated as signals $C_{sa}$ and $C_{sb}$, the fact that the arm of the switching circuit is held fixed in one position during the playback of the track 58 in FIG. 4 but is switched from one of its positions to the other at the end of each line interval during the playback of the track 59 in FIG. 4, results in eliminating the ½(h) offset of the signal $C_b$. Thus, the reconverted signals $C_{sa}$ and $C_{sb}$ both have the same carrier frequency $f_s$, which is the original chrominance sub-carrier frequency of the television system. In the spectra shown in FIGS. 7E and 7F the undesired cross-talk signals $C_{sa}'$ and $C_{sb}'$ are spaced midway between the principal side bands of the deisred signals $C_{sa}$ and $C_{sb}$ and can be eliminated by the comb filter 81 to yield the desired signal $C_s$, which is shown in FIG. 7G and is free of cross-talk components.

In the above-described magnetic recording apparatus in FIG. 3 and the reproducing apparatus in FIG. 5, the simple logic circuit comprising the horizontal and vertical sync separators 36 and 37, the flip-flops 38 and 39, and the AND gate 41 is used to form the switching signal $P_k$. However, during recording or reproducing of the track $T_b$, it is equally possible for the flip-flop 38 to generate a signal having the polarity shown in FIG. 8C or a signal having the opposite polarity.

Figure 8A:
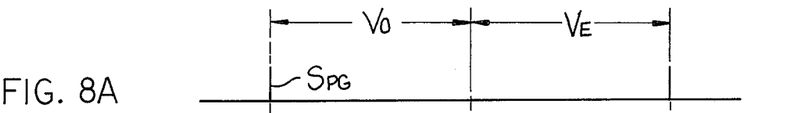
FIGS. 8A–8E represent voltage waveforms that can be obtained in the switch-controlling circuits in FIGS. 3, 5, and 9.
Figures 8B, 8C, 8D:
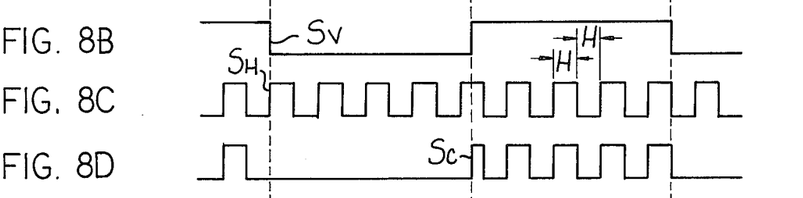
Figure 8E:
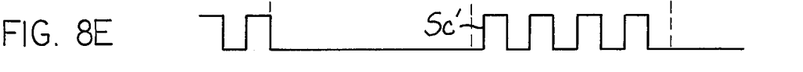
Figure 9A:
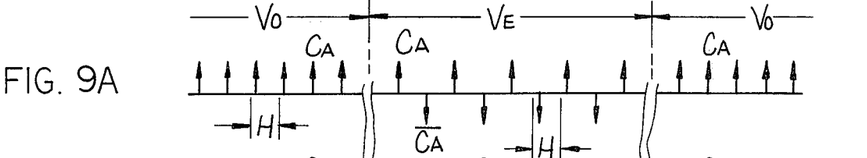
FIGS. 9A–9C show vectors representative of signal polarities that may be obtained in the operation of the circuits in FIGS. 3, 5, and 9.
Figures 9B, 9C:
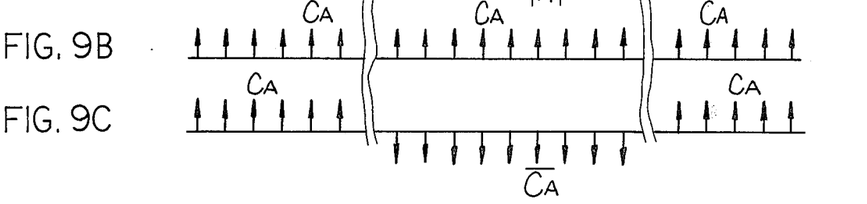

Now assume that during playback, when the polarity of the signal from the flip-flop 38 is such that the switching circuit 33 is switched by the correct switching signal $S_C$ in FIG. 8D. The chrominance signal that has a different polarity at every line interval in the alternate field intervals $V_E$, as shown in FIG. 9A, will have its polarity reversed during the correct lines to coincide with the polarity in the remaining field intervals, as shown in FIG. 9B. However, it will be apparent that, if the signal $S_H$ produced by the flip-flop 38 has a polarity opposite to that in FIG. 8C and therefore the switching signal $S_C'$ as shown in FIG. 8E is applied to the switching circuit 33, the polarity of the chrominance signal obtained therefrom will be different by 180° at every field interval $V_E$ and $V_O$, as shown in FIG. 9C.

The conventional magnetic video recording and reproducing apparatus is provided with an automatic phase control circuit, referred to as an A.P.C. circuit, in which the frequency of the carrier signal applied to the modulator is controlled in response to the burst signal contained in the reproduced chrominance signal.

As shown in FIG. 5, the embodiment according to the present invention is also provided with an A.P.C. circuit, which comprises the burst gate circuit 82 that receives the burst signal from the reproduced chrominance signal, the oscillator 83 that generates the reference signal having a constant phase, and the phase comparator 84 in which the phase of the reproduced burst signal and the phase of the reference signal are compared to each other. A control signal is produced by the comparator 84 to control the phase of the oscillator 79 so that the A.P.C. loop will be operative to hold the chrominance signal obtained at the output of the comb filter 81 at a constant phase regardless of the field interval. However, for a short time after the phase of the carrier signal of the reproduced chrominance signal changes, as shown in FIG. 9C, the A.P.C. circuit cannot follow the rapid change immediately. As a result, the hue balanced of the chrominance signal will be distrubed at initial parts of each field interval.

Figure 10:
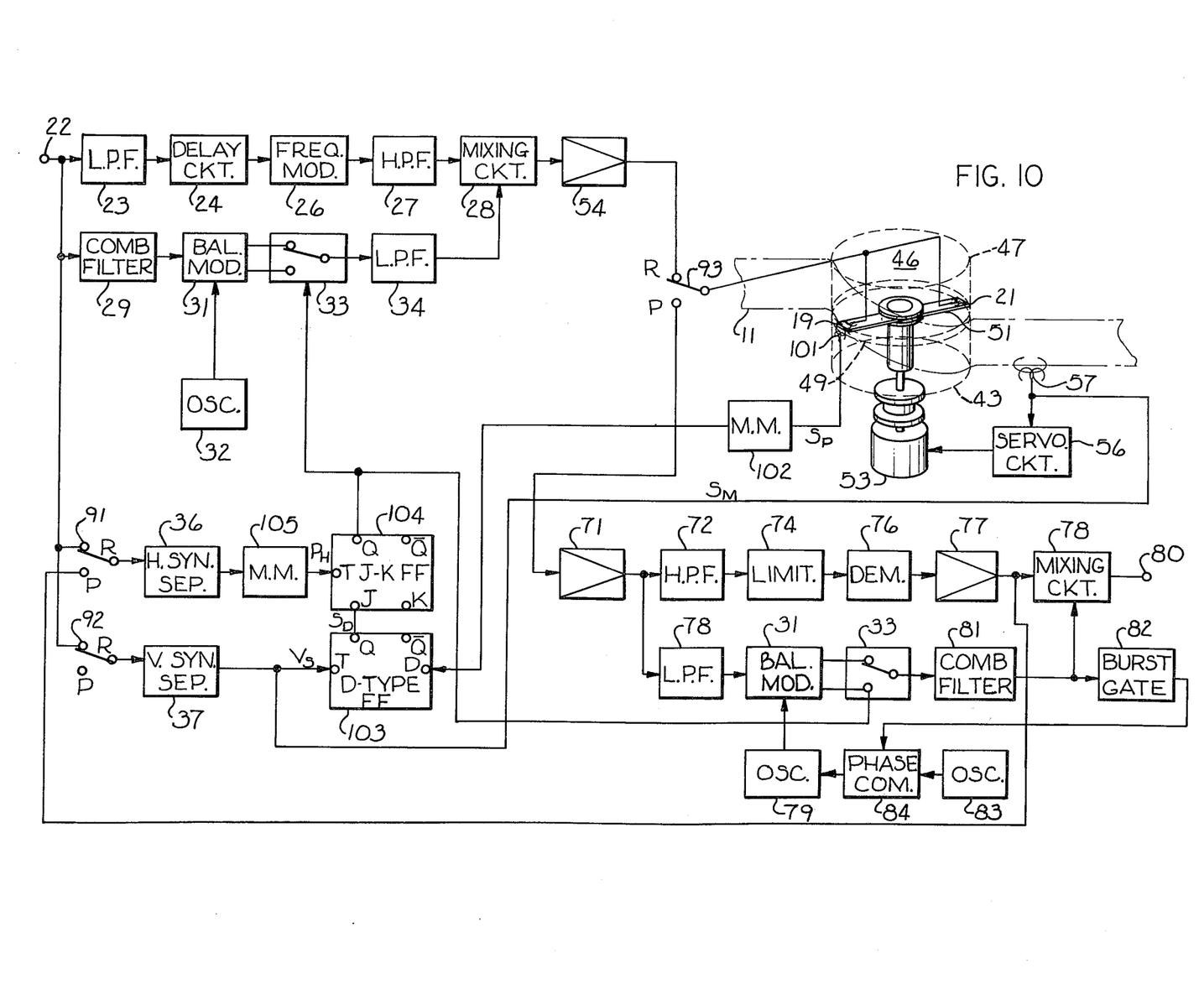
FIG. 10 shows apparatus for recording and reproducing video signals in accordance with the present invention.

FIG. 10 shows an improved embodiment according to this invention, including both recording and reproducing sections, to overcome the above-described defect. The recording section includes many components found in the recording apparatus shown in FIG. 3 and the playback section includes some components found in the playback apparatus of FIG. 5. The description of these components and their operation will not be unnecessarily repeated.

Between the input terminal 22 and the horizontal and vertical synchronizing separators 36 and 37 are two double throw switches 91 and 92. The arm of another double throw switch 93 is connected to the transducers 19 and 21. The arm of each of the switches 91–93 makes contact either with a pole identified R or a pole identified P, depending upon whether the apparatus is to be used for recording or playback. In practice the arms of the three switches 91–93 would be mechanically linked together to operate as a three-pole double-throw switch.

The chrominance components of the video signal applied to the input terminal 22 to be recorded are separated out by the comb filter 29 and applied to a balanced modulator 31, which also receives signals that originate in an oscillator 32. The modulator 31 has two output terminals of opposite polarity. These output terminals are connected to two fixed terminals of a switching circuit 33, and the arm of the switching circuit is connected through a low pass filter 34 to the mixing circuit 54.

Figures 11A, 11B, 11C:
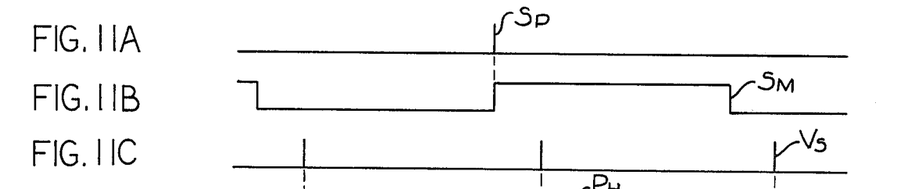
FIGS. 11A-11F illustrate voltage wavoeforms that occur in the operation of the apparatus in FIG. 10.
Figures 11D, 11E, 11F:
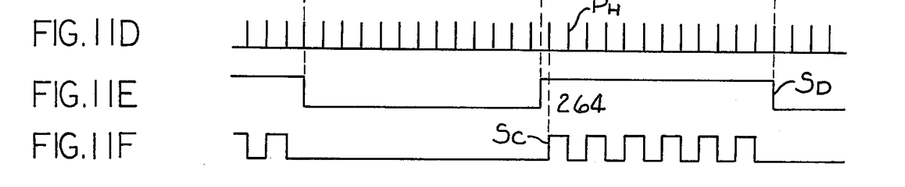

In this embodiment, the logic circuit controlling the switching circuit 33 is constructed in such manner that the output from the logic circuit forces the movable arm of the switching circuit 33 to connect to one pole at certain predetermined horizontal intervals. The logic circuit is provided with a pulse generator 101, that generates pulse signals $S_P$, as shown in FIG. 11A, having a frequency of 30Hz, and a monostable multivibrator 102 triggered by the pulse signals $S_P$ to generate a rectangular signal $S_M$, as shown in FIG. 11B. The signal $S_M$ has a D.C. level of [0] during the recording of the track by the head 19 on the tape 11 and a D.C. level of [1] during the recording of the track by the head 21 on the tape 11. The rectangular signal $S_M$ is supplied to the D-terminal of a D-type flip-flop 103, whereas the vertical sync signal $V_S$ shown in FIG. 11C which is separated from the composite signal of the vertical sync signal separator 37 is supplied to the timing terminal of the flip-flop 103. With the flip-flop 103 being thus connected, the output signal obtained from the Q-terminal thereof will be a rectangular signal $S_D$ shown in FIG. 11E, which goes up at the time when the vertical sync signal $V_S$ is supplied thereto during the signal $S_M$ has a D.C. level [1] and goes down in response to the following vertical sync signal $V_S$. The rectangular signal $S_D$ is supplied to the J-terminal of the J-K flip-flop 104, whereas the signal $P_H$ shown in FIG. 11D, which is formed by separating the horizontal sync signal from the composite sync signal by the horizontal sync separator 36 and applying them to a monostable multivibrator 105, is also supplied to the timing terminal thereof. The output signal $S_C$ obtained from the Q-terminal of the J-K flip-flop 104 is supplied to the switching circuit 33 as the switching signal. It will be apparent that the signal $S_C$ has a D.C. level of [0] while the signal $S_D$ is [0], but changes from the D.C. level [0] or from the level [1] to [0] at the end of every horizontal interval during the time that the signal $S_D$ is [1]. In addition, it should be noted that the switching signal $S_C$ goes up at the time when the first horizontal rate sync signal $P_H$ is supplied thereto after the rectangular signal $S_D$ goes up to [1]. This means that, if the time relation between the horizontal rate sync signal $P_H$ and the signal $S_D$ is as shown in FIG. 11, the signal $S_C$ will always be [1] in the even horizontal intervals of the even field intervals during recording. As a result, the switching circuit will be switched to the opposite pole from that in FIG. 10 during the even horizontal line interval of the even field intervals, so that the chrominance signal $\overline{C_A}$ having the opposite polarity will be supplied to the mixing circuit 28 in only the above-described intervals. In the remaining intervals, the switching circuit 33 is in the state shown in FIG. 10, so that the chrominance signal $C_A$ having the positive polarity is supplied to the mixing circuit 28.

During playback, the time relation between the signal $P_H$ and the signal $S_D$ is the same as that in recording. Accordingly, during the even horizontal line intervals of the even field intervals, the switching circuit 33 is switched to the opposite state from that in FIG. 10, so that the chrominance signal $C_A$ having the positive polarity will be obtained therefrom. During the remaining intervals, the switching circuit 33 is in the state in FIG. 10, so that the chrominance signal $C_A$ will be obtained as it was recorded. Thus, the chrominance signal obtained from the switching circuit 33 will have a constant polarity for every field interval.

Also, it will be apparent that the apparatus will produce a similar result if the signal $S_D$ has a DC level of [1] during odd field intervals and a DC level of [0] during even field intervals.

Figure 12:
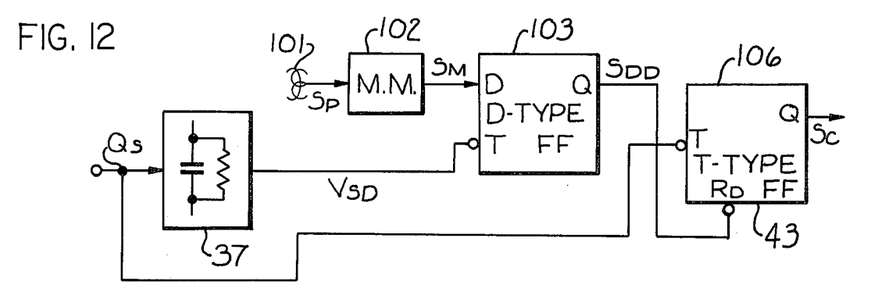
FIG. 12 is a schematic diagram of a modified embodiment of a circuit to control the operation of switching circuits in the apparatus in FIG. 10 in accordance with this invention.
Figures 13A, 13B, 13C:
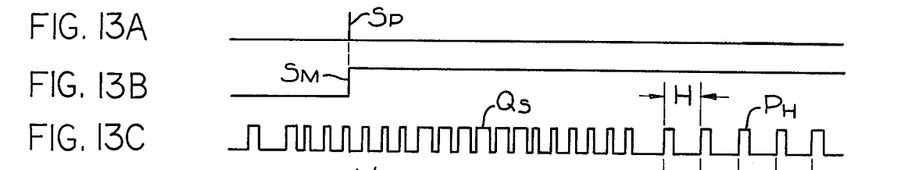
FIGS. 13A-13F illustrate voltage waveforms that occur in the operation of the circuit in FIG. 12.
Figure 13D:
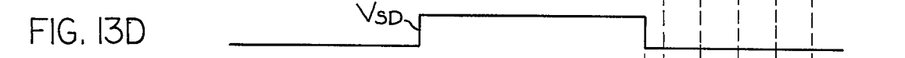
Figure 13E:
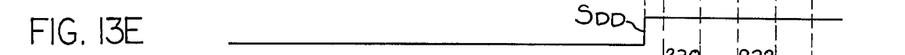
Figure 13F:
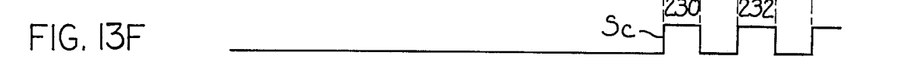

FIG. 12 shows another embodiment of the logic circuit according to this invention, in which a T-type flip-flop (106) is used instead of the J-K flip-flop 104. In FIG. 12, the rectangular wave signal $S_M$ is supplied to the D-terminal of the flip-flop 103, whereas the vertical sync signal $V_{SD}$, as shown in FIG. 13D, which is separated out of the composite synchronizing signal $Q_S$, as shown in FIG. 13C, by the vertical sync separator 37, is supplied to the timing terminal of the flip-flop 106. The rectangular wave signal $S_{DD}$, as shown in FIG. 13E, obtained from the Q-output terminal of the flip-flop 103 goes up at the trailing edge of the signal $V_{SD}$ and goes down at the trailing edge of the following signal $V_{SD}$. The signal $S_{DD}$ is supplied to the reset terminal $R_D$ of the T-type flip-flop 106 and the composite synchronizing signal $Q_S$ is supplied to the T-input terminal of the flip-flop 106.

With the logic circuit constructed in this way, the output signal $S_C$ obtained from the Q-output terminal of the flip-flop 106 will always be [0] when the signal $S_{DD}$ is [0], and will be [0] or [1] alternatively during the correct horizontal intervals. Further, it will be apparent that the signal $S_C$ has DC level [1] during even horizontal intervals of the even field intervals. Accordingly, the logic circuit shown in FIG. 12 has the same effect and operation as the logic section of the circuit shown in FIG. 10.

The magnetic recording and/or reproducing apparatus according to the present invention can be used not only for NTSC signals, but also for PAL signals. In the apparatus for PAL signals, the switching circuit 33 is switched at every second horizontal interval and the comb filter 81 is constructed in such a manner that the chrominance signal during each line interval and the chrominance signal from the second preceeding line interval are combined.

Figure 14A:
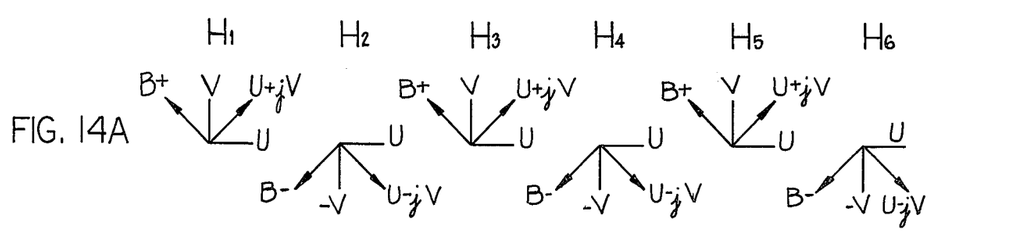
FIGS. 14A-14G are vector and voltage waveform representations for a PAL color television signal.

As shown in FIG. 14A, a PAL signal is characterized by the reversal of polarity (or 180° phase shift) of the sub-carrier of one chrominance component at line repetition rate. The sub-carrier to be reversed is the one on which the red color difference signal is modulated. This signal is represented by the vector V and is sometimes referred to as the (R-Y) signal. The blue color difference signal referred to by the vector U, and sometimes referred to as the (B-Y) signal is modulated on a sub-carrier that has the same frequency as that on which the red color difference signal is modulated but has a constant phase. The vector sum of the V and U components during alternate line intervals $H_1$, $H_3$, $H_5$ ..., is the signal $U + jV$. During the remaining alternate line intervals $H_2$, $H_4$, $H_6$ ..., when the carrier for the V signal is inverted, the vector sum is $U-jV$.

Figures 14B, 14C, 14D:
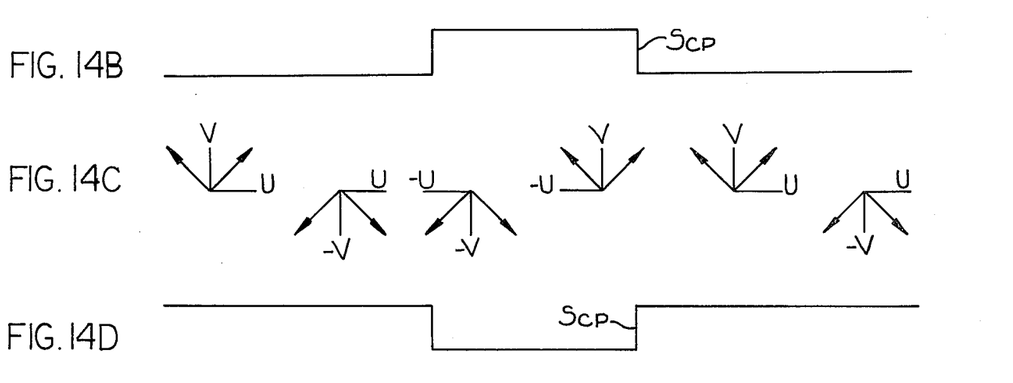
Figure 14E:
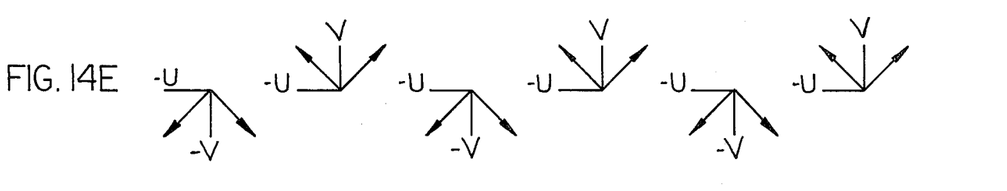
Figure 14F:
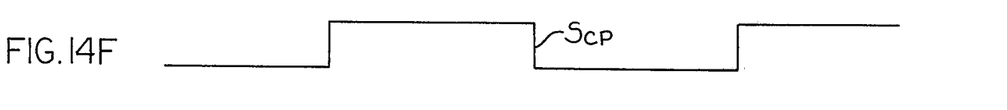
Figure 14G:
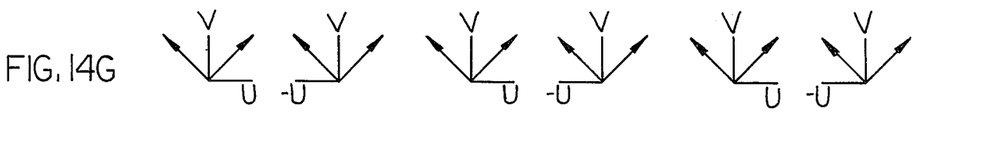
Figure 15:
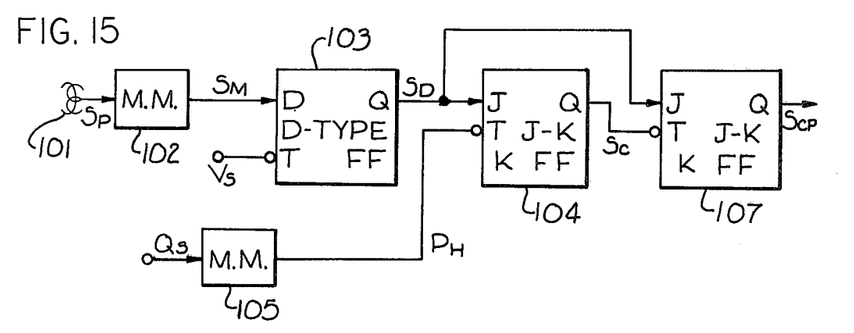
FIG. 15 is a modified embodiment of a circuit to control the switching operation in the apparatus in FIG. 10 to accommodate PAL color television signals in accordance with this invention.

In order to allow a PAL signal to be properly decoded, the burst signal used to synchronize the local sub-carrier oscillator in the playback unit, or receiver, has two phase relationships. During line intervals $H_1$, $H_3$, $H_5$ ..., the burst signal is illustrated by the vector B+, which is 135° counterclockwise from the axis of the sub-carrier on which the V signal is modulated. During the remaining alternate line intervals $H_2$, $H_4$, $H_6$ ..., the burst signal has a phase relationship illustrated by the vector B–, which is 90° removed from the angle of the B+ vector and is 225° counterclockwise from the axis of the U signal. Assuming that the switching signal $S_{CP}$ shown in FIG. 14B, which is reversed during alternate pairs of horizontal intervals $H_3$-$H_4$, $H_7$-$H_8$ ..., is supplied to the switching circuit 33 during recording, the phase of the chrominance carrier signal is reversed during those intervals as shown in FIG. 14C. Accordingly, the switching signal to be supplied to the switching circuit 33 in the reproducing section has to correspond to the signal $S_{CP}$ in the recording section. If the switching signal $S_{CP}$ in the reproducing section has the opposite polarity from that in the recording section, as shown in FIG. 14D, the chrominance signal obtained from the switching circuit 33 will be reversed in phase from the original one. Further, if the switching signal $S_{CP}$ in the reproducing section is different by 90° from that in the recording section, as shown in FIG. 14F, the switched chrominance signal shown in FIG. 14G will be a quite different signal from the correct PAL signal.

Figure 17A:
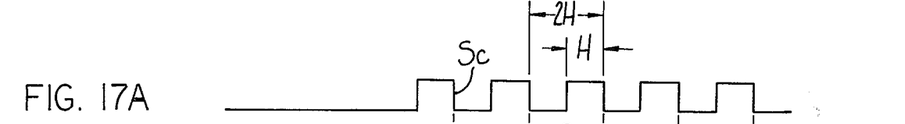
FIGS. 17A and 17B show voltage waveforms representative of the operation of the switching circuit during PAL color television recording and reproducing.
Figure 17B:
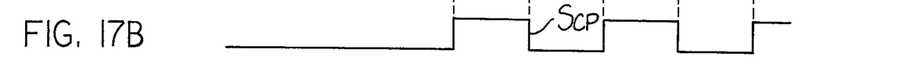

However, according to the present invention, it is possible to obtain the desired chrominance signal easily in the case of a PAL signal. To achieve this, the logic circuit shown in FIG. 10 is further provided with another J-K flip-flop 107 in which the switching signal $S_C$ supplied from the Q-output terminal of the J-K flip-flop 104 is frequency divided to one-half the frequency of the switching signal $S_C$. In order to perform this frequency division, the output signal $S_C$ is supplied to the timing terminal of the flip-flop 107, and the output signal $S_D$ from the D-type flip-flop 103 is supplied to the J-input terminal of the flip-flop 107. The frequency divided switching signal $S_{CP}$ shown in FIG. 17B is obtained from the Q-output terminal of the flip-flop 107.

Figure 16:
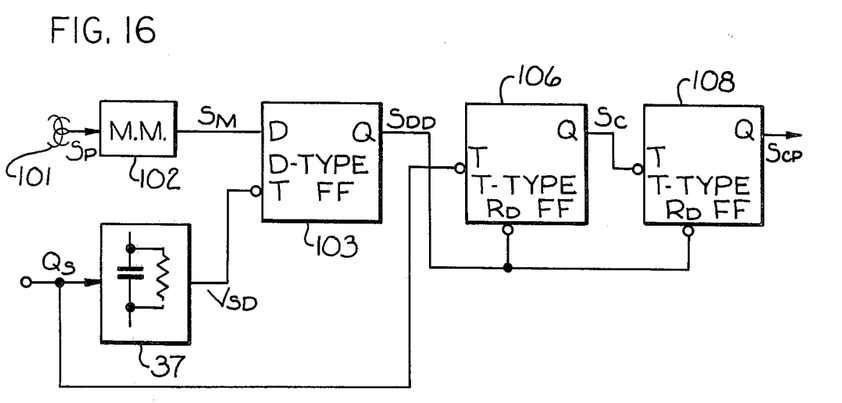
FIG. 16 is another embodiment of a circuit to control the switching operation of the apparatus in FIG. 10 to accommodate PAL color television signals in accordance with this invention.

In a similar way, the logic circuit in FIG. 16, which corresponds to that in FIG. 12, can also be provided with another T-type flip-flop 108, in which the signal $S_C$ from the flip-flop 106 is frequency divided.

With the logic circuit for a PAL signal thus constructed, the switching signal $S_{CP}$, which is obtained by frequency dividing the signal $S_C$ having the value [1] during the even (or odd) line intervals of the even (or odd) field intervals and [0] in the remaining intervals, will be [1] in the even (or odd) numbers of the succeeding two line intervals of the even (or odd) field intervals and [0] in the remaining intervals. As a result, when the switching circuit 33 in the recording and reproducing sections are controlled by the switching signal $S_{CP}$, the phase of the chrominance signal during playback will be the same as during recording.

Further, although in the above-described embodiment, the switching circuit is inserted in the transmission line of the chrominance signal, it might be connected, instead, after the carrier oscillator 32 so that the phase of the carrier signal is reversed.

What is claimed is:

1. In a system in which television signals comprising line intervals and field intervals are recorded on a recording medium by rotary transducer means, the television signal including chrominance components, the system including switching means to cause at least selected ones of the chrominance components to have one polarity in every line interval in alternate field intervals and to change from the one polarity to the opposite polarity at the end of selected line intervals of the remaining alternate field intervals, switch controlling means comprising:
   A. a first flip-flop responsive to a first timing signal at the field repetition rate;
   B. a signal generator to generate signals synchronous with rotation of the transducer means, said signal generator being connected to a control terminal of said flip-flop to control the polarity of the output signal therefrom to have a specific polarity during even fields and reverse polarity during odd fields;
   C. a second flip-flop responsive to a second timing signal at the line repetition rate; and
   D. a connection from an output terminal of said first flip-flop to a controlling input terminal of said second flip-flop to allow said second flip-flop to operate only during those alternate fields when the output signal of said first flip-flop has a predetermined one of said polarities, said second flip-flop having an output signal of predetermined polarity for the first line interval of each of the fields in which the second flip-flop operates.

2. The system of claim 1 in which said first flip-flop is a D-type flip-flop having a timing input terminal to receive the first timing signal and a control input terminal connected to receive signals from said signal generator, and said second flip-flop is a J-K flip-flop having a timing input terminal to receive the second timing signal and a control input terminal connected to an output terminal of said first flip-flop to be controlled thereby.

3. The system of claim 1 in which said first flip-flop is a D-type flip-flop having a timing input terminal to receive the first timing signal and a control input terminal connected to receive signals from said signal generator, and said second flip-flop is a T-type flip-flop having a timing input terminal to receive the second timing signal and a control input terminal connected to an output terminal of said first flip-flop to be controlled thereby.

4. The system of claim 3 comprising means to generate said first timing signal from the field synchronizing signal, said first timing signal having a trailing edge preceding the first line synchronizing signal in the next field interval, and said T-type flip-flop being controlled by said trailing edge.

5. The system of claim 2 comprising a second J-K flip-flop comprising a timing input terminal connected to an output terminal of the first J-K flip-flop and a control input terminal connected to said output terminal of said D-type flip-flop to generate, only during those alternate fields when the first J-K flip-flop operates, a square wave having a repetition rate equal to one-half the line repetition rate.

6. The system of claim 3 comprising a second T-type flip-flop comprising a timing input terminal connected to an output terminal of the first T-type flip-flop and a control input terminal connected to said output terminal of said D-type flip-flop to generate, only during those alternate fields when the first T-type flip-flop operates, a square wave having a repetition rate equal to one-half the line repetition rate.

* * * * *